(No Model.)
A. FILKINS.
THILL COUPLING.
No. 325,331. Patented Sept. 1, 1885.
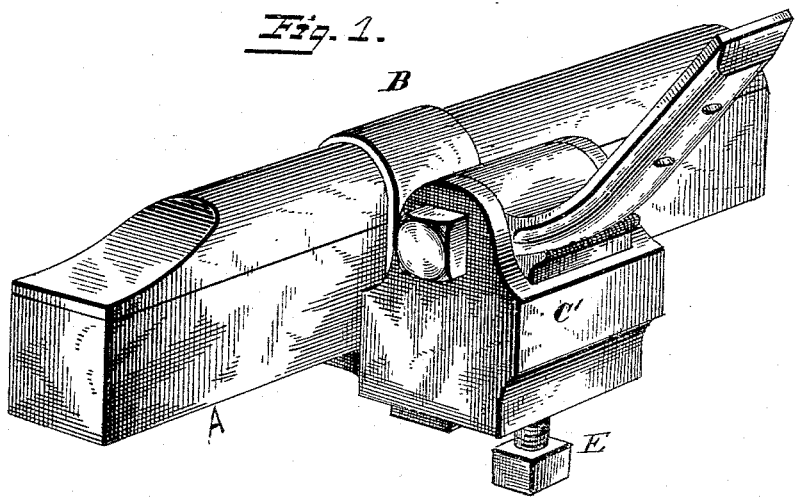
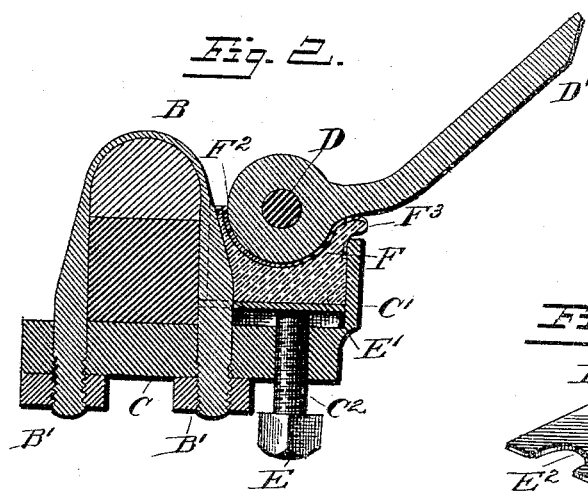
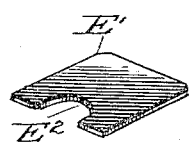
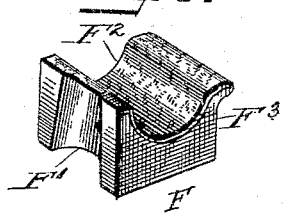
WITNESSES
L.C.Hills
Wm S. Duvall
INVENTOR
Adelbert Filkins
By E.B.Stoetting
Attorney

UNITED STATES PATENT OFFICE.

ADELBERT FILKINS, OF MALTAVILLE, NEW YORK.

THILL-COUPLING.

SPECIFICATION forming part of Letters Patent No. 325,331, dated September 1, 1885.

Application filed June 11, 1885. (No model.)

*To all whom it may concern:*

Be it known that I, ADELBERT FILKINS, a citizen of the United States, residing at Maltaville, in the county of Saratoga and State of New York, have invented certain new and useful Improvements in Thill-Couplings, of which the following is a specification, reference being had to the accompanying drawings.

My invention relates to thill-couplings, my object being to provide an anti-rattling device for connecting the shafts or poles to vehicles; and the invention consists in certain features of construction hereinafter described, and particularly set forth in the claim.

Referring to the drawings, Figure 1 is a perspective of an axle provided with my coupling. Fig. 2 is a central vertical section, and Figs. 3 and 4 are details hereinafter described.

Like letters indicate like parts in all the figures of the drawings.

A represents the axle of a vehicle, mounted upon which is the usual clip, B, the ends of which are screw-threaded and provided with nuts B'.

Interposed between the nuts B' and the under surface of the axle is a plate or tie-bar, C, at one end of which is integrally formed a square housing, C', in the sides of which are formed bearings for the coupling-bolt D, upon which is mounted the shaft-iron D'. The housing C' is formed with three walls only, the rear side being left open to facilitate compactness of construction, the axle acting as the fourth wall of the housing. The housing is perforated in its bottom, as at C², for the reception of a thumb or set screw, E, which bears upon a follower-plate, E', which fits within the housing C', and is recessed at one end, so as to straddle the rib on the clip B.

Interposed between the follower-plate and the shaft-iron is a rubber cushion, F, which conforms to the shape of the housing C', and which is also grooved or recessed at F' in its back to straddle the rib on the clip B. This cushion is formed with a concavity, F³, in its upper surface conforming to the cylindrical outline of the shaft-iron, and upon this curved surface is firmly secured a covering, F², of textile fabric, which forms the bearing-surface for the shaft-iron. It will thus be seen that with this facing or bearing-surface, no matter how snug the cushion may be adjusted by means of the screw E against the shaft-iron, there will be no torsional movement or twisting of the rubber when the shafts are elevated or lowered, as is usually the case in this class of couplers, and the rubber, by being relieved of this tearing strain, will last much longer.

The cushion is formed with a projecting lip, F³, at its front portion, which extends out under the shaft-iron and over the front wall of the housing, and forms an additional yielding support for the shaft-iron.

By my construction I secure a perfect anti-rattler that is strong, simple in construction, and exceedingly compact, and requiring a minimum of length in the tie-bar, whereby there is less strain on the clip-bolt. Should the rubber become worn, all space can be taken up by means of the set-screw, and thus the device can be kept perfectly compact and no rattling permitted so long as the rubber cushion lasts.

By recessing the rubber and follower-plate as shown, and omitting the rear wall of the housing the device is packed more closely against the axle, and does not protrude any farther than does the ordinary clip-coupling.

Having described my invention and its operation, what I claim, and desire to secure by Letters Patent, is—

In a thill-coupling, the tie-bar C, perforated for the passage therethrough of clip-bolts B', and having cast thereon at its front end a three-sided housing, C', the bottom of which is perforated for the reception of a set-screw, and the side walls of which are perforated to form bearings for the bolt D' of the shank-iron, in combination with the cushion F, concaved as at F³, and provided with the textile covering F², the rear end of said cushion being vertically grooved, as at F', adapted to straddle the clip B, and the follower-plate E', grooved as at E², substantially as shown and described.

In testimony whereof I affix my signature in presence of two witnesses.

ADELBERT FILKINS.

Witnesses:
JOHN C. GREENE,
WILLIAM C. SWORT.